United States Patent
Monajemi et al.

(10) Patent No.: US 11,722,931 B2
(45) Date of Patent: Aug. 8, 2023

(54) MITIGATION OF ACTIVE LINK ALTERNATION BY MULTI-LINK DEVICES

(71) Applicant: Cisco Technology, Inc., San Jose, CA (US)

(72) Inventors: Pooya Monajemi, Irvine, CA (US); Vishal Satyendra Desai, San Jose, CA (US); Santosh Babaji Kulkarni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 17/219,376

(22) Filed: Mar. 31, 2021

(65) Prior Publication Data

US 2022/0322145 A1 Oct. 6, 2022

(51) Int. Cl.
*H04W 28/10* (2009.01)
*H04W 28/02* (2009.01)

(52) U.S. Cl.
CPC ....... *H04W 28/10* (2013.01); *H04W 28/0252* (2013.01)

(58) Field of Classification Search
CPC .......................... H04W 28/10; H04W 28/0252
See application file for complete search history.

(56) References Cited

U.S. PATENT DOCUMENTS

| | | | | |
|---|---|---|---|---|
| 2018/0206190 A1* | 7/2018 | Cherian | ............... | H04B 1/1615 |
| 2018/0206284 A1* | 7/2018 | Zhou | .................... | H04B 1/0483 |
| 2019/0053325 A1* | 2/2019 | Yu | ......................... | H04W 76/15 |
| 2019/0082373 A1* | 3/2019 | Patil | ...................... | H04L 1/1614 |
| 2019/0297571 A1* | 9/2019 | Jose | .................. | H04W 52/0229 |
| 2019/0335454 A1 | 10/2019 | Huang et al. | | |
| 2020/0221545 A1 | 7/2020 | Stacey et al. | | |
| 2021/0266998 A1* | 8/2021 | Ho | ........................ | H04W 48/16 |
| 2021/0289417 A1* | 9/2021 | Sun | ....................... | H04W 40/02 |
| 2021/0289442 A1* | 9/2021 | Naribole | ........... | H04W 52/0235 |

(Continued)

FOREIGN PATENT DOCUMENTS

WO 2015184379 A2 12/2015

OTHER PUBLICATIONS

Evgeny Khorov et al., Current Status and Directions of IEEE 802.11be, the Future Wi-Fi 7, IEEE Access, May 21, 2020, 25 pages.

(Continued)

*Primary Examiner* — Parth Patel
(74) *Attorney, Agent, or Firm* — Merchant & Gould P.C.

(57) ABSTRACT

Mitigation of active link alternation by multi-link devices (MLDs) may be provided. First, at least first and second links may be established between an Access Point (AP) MLD and an associated MLD client. The first link may be active, while the second link may be inactive. A set of traffic load data associated with the links may be collected before and after transmission of a Basic Service Set (BSS) load report to the MLD client. The report may include a traffic load on the second link prior to transmission, where the second link is less loaded than the first link. Based on the collected traffic load data, an active link alternation from the first to the second link by the MLD client responsive to receiving the report may be detected. One or more methods for BSS load report management may then be applied to mitigate future active link alternation.

20 Claims, 5 Drawing Sheets

(56) References Cited

U.S. PATENT DOCUMENTS

| | | | |
|---|---|---|---|
| 2021/0352669 A1* | 11/2021 | Lu | H04W 72/0453 |
| 2021/0409979 A1* | 12/2021 | Wang | H04W 52/0258 |
| 2022/0174768 A1* | 6/2022 | Kim | H04L 69/24 |
| 2022/0201606 A1* | 6/2022 | Shafin | H04L 1/1678 |
| 2022/0264429 A1* | 8/2022 | Gan | H04W 52/0216 |
| 2022/0322145 A1* | 10/2022 | Monajemi | H04W 28/0252 |

OTHER PUBLICATIONS

Dibakar Das et al., AP assisted ML operation, IEEE 802.11-19/1930r3, Jun. 3, 2019, 23 Pages.

* cited by examiner

MITIGATION OF ACTIVE LINK ALTERNATION BY MULTI-LINK DEVICES

TECHNICAL FIELD

The present disclosure relates generally to wireless networking.

BACKGROUND

In computer networking, a wireless Access Point (AP) is a networking hardware device that allows a Wi-Fi compatible client to connect to a wired network and to other clients. The AP usually connects to a router (directly or indirectly via a wired network) as a standalone device, but it can also be an integral component of the router itself. Several APs may also work in coordination through direct wired or wireless connections, or through a central system commonly called a Wireless Local Area Network (WLAN) controller. An AP is differentiated from a hotspot, which is the physical location where Wi-Fi access to a WLAN is available.

An AP connects to a wired network, then provides Radio Frequency (RF) links (e.g., channels) for other radio devices, such as clients associated with that AP, to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
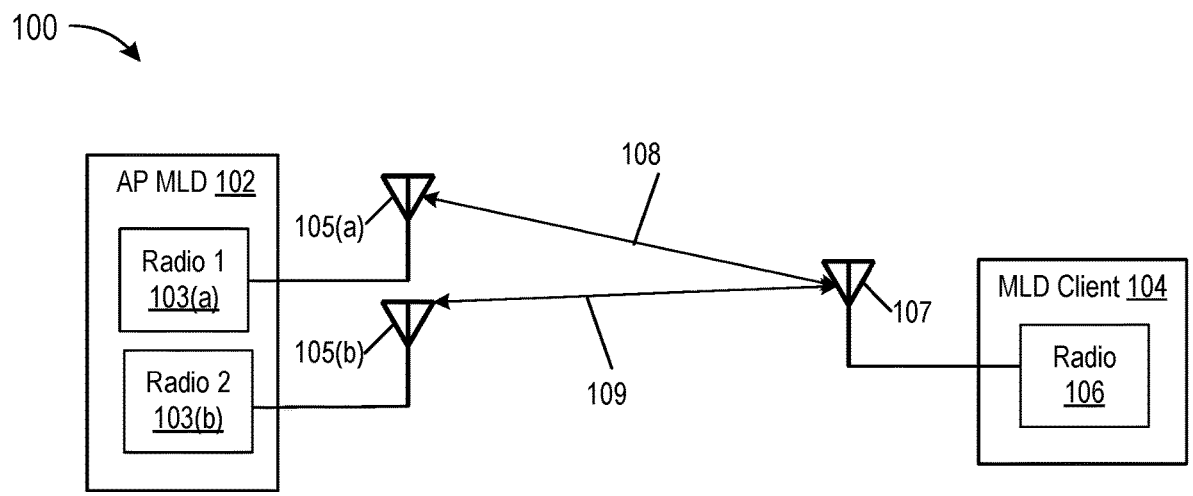
FIG. 1 is a block diagram of a wireless network.

Mitigation of active link alternation by multi-link devices includes accepting, by an Access Point (AP) Multi-Link Device (MLD), an association with an MLD client, where a first link and a second link are established between the AP MLD and the MLD client, the first link is an active link over which MLD client transmits and receives data to and from the AP MLD, and the second link is an inactive link. Then, a first set of traffic load data associated with the first and second links is collected, and a BSS load report is transmitted to the MLD client. The BSS load report may include a traffic load on the second link obtained from the first set of traffic load data, where the second link is less loaded than the first link. Next, a second set of traffic load data associated with the first and second links is collected, and based on the first and second sets of traffic load data, an active link alternation from the first link to the second link by the MLD client is detected responsive to the MLD client receiving the BSS load report. Last, future active link alternation may be mitigated through BSS load report management.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Institute of Electrical and Electronics Engineers (IEEE) 802.11be is part of the IEEE 802 Local Area Network (LAN) protocols and introduces the concept of Multi-Link Devices (MLDs). MLDs may include Access Point (AP) MLDs and non-AP MLDs (the non-AP MLDs also referred to herein as MLD clients). In some aspects, an MLD client may be a multi-radio MLD client that carries and/or operates multiple independent radios. As part of association of the multi-radio MLD client to an AP MLD, a link may be established between the AP MLD and each of the multiple independent radios, where the links may be simultaneously active. In other aspects, an MLD client may have a single radio. As part of association of the single-radio MLD client to an AP MLD, multiple links (e.g., at least two links) may be established between the AP MLD and the single-radio MLD client, but only one of those links can be active at a time. Or a multi-radio client MLD may choose to remain active on one link at a time, for example, in order to conserve power.

Various mechanisms may be implemented to assist single-radio MLD clients in selecting a link from the multiple established links upon which to operate (e.g., to assist in active link selection). Conventionally, an AP may announce medium conditions on a link (e.g., on-link load measurements) to one or more associated clients active on that particular link through a Basic Service Set (BSS) load report, hereinafter referred to as an on-link BSS load report. For example, the AP MLD can announce on a 6 GHz link load parameters on the 6 GHz link. A mechanism may further enable the AP MLD to announce on each link the medium conditions on other links (e.g., out-of-link load measurements) through an out-of-link BSS load report broadcast or transmitted to the one or more associated MLD clients on each link. For example, the AP MLD can announce on a 6 GHz link load parameters on the 2.4 GHz and 5 GHz links using the out-of-link BSS load report. Each of the on-link and out-of-link BSS load reports may include information that indicates how busy channels of the respective links are, such as channel utilization and Quality of Service Basic Service Set (QBSS) load. Therefore, this announcement by the AP MLD to the MLD client of the medium conditions on other links, in addition to the MLD client's knowledge of medium conditions on its currently active link, assists the MLD client in choosing which of the multiple links to select as an active link over which to communicate with the AP MLD on. For example, the MLD client may choose the least-loaded link.

While the out-of-link BSS load reports are helpful to provide this assistance, it may also lead an MLD client to repetitively alternate between active links, e.g., alternate from one link to another link by continuously following the least-loaded link upon receipt of an out-of-link BSS load report. This type of pattern may also be referred to as zig-zag behavior For example, an MLD client having established at least a first link and a second link with an AP MLD may initially transmit and receive data on the first link (e.g., the first link is the active link), but upon receipt of an out-of-link BSS load report on the first link indicating that the second link has a lesser load, the MLD client may alternate active links from the first link to the second link. Other MLD clients associated with the AP MLD via the same two links may similarly move their traffic based on the out-of-link BSS load report (e.g., if broadcasted on the first link). As a result, the first link may now have a lesser load than the second link such that when the next out-of-link BSS load report is broadcast, the MLD client, along with the other MLD clients associated with the AP MLD, may once again alternate active links from the second link back to the first link.

In another embodiment, independent of receipt of an out-of-link BSS report, the MLD client may temporarily alternate from the first link that is currently the active link (and of which the MLD client has a current traffic load knowledge thereof) to the second link in order to retrieve information about traffic load on the second link to make a decision whether to transmit and receive data over the first or second link.

Single-radio MLD clients are particularly prone to active link alternation based on their limitation of only having one link of the multiple established links active at a same time. However, active link alternation may also present an issue in multi-radio MLD clients. Accordingly, the disclosure provided herein should not be deemed as being limited to single-radio MLD clients but should rather be deemed to encompass multi-radio MLD clients as well; the term "MLD client" is intended to encompass single and multi-radio clients having MLD capabilities.

The present disclosure is directed to the detection and mitigation of active link alternation. Once active link alternation by one or more associated MLD clients is detected, variations in BSS load report management may be implemented by the AP MLD to mitigate the active link alternation. The variations can include one or more of the following BSS load report management methods: (a) temporarily halting broadcast of out-of-link BSS load reports by the AP MLD; (b) modifying load values in a unicast BSS load report that is transmitted to an MLD client by the AP MLD; (c) performing selective unicast BSS load reporting to one or more MLD clients by the AP MLD; and (d) disassociating an MLD client from the AP MLD. Each of these methods can be performed individually or in various combinations. Other variations in BSS load report management may also be possible.

The present disclosure provides technical solutions for implementation in a wireless network to mitigate active link alternation by MLD clients. Mitigating active link alternation by MLD clients provides more equally balanced traffic loads over links supported by a BSS of the wireless network, which serves to reduce latency in data transmissions as well as achieve gains in throughput (e.g., if channel utilization meet a predefined threshold as a result of the load balancing).

FIG. 1 provides a block diagram of an exemplary wireless network 100 that supports network devices with multi-link capabilities. As shown, wireless network 100 includes an AP MLD 102 and an MLD client 104 that is associated with the AP MLD 102 to connect to network 100, where AP MLD 102, MLD client 104, and any other clients associated with first AP MLD 102 may form a BSS. An exemplary AP MLD 102 includes an integrated radio communication system that includes a plurality of radios and antennas, including radios 103(a) and 103(b) and corresponding antennas 105(a) and 105(b). Likewise, MLD client 104 may include an integrated radio communication system comprising a radio 106 and an antenna 107.

MLD client 104 may be a non-AP MLD. For example, MLD client 104 may comprise, but is not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network.

MLD client 104 may associate with AP MLD 102 using an MLD setup procedure (e.g., a multi-link setup signaling exchange) defined by a standard or protocol, such as IEEE 802.11be. As part of the setup, MLD client 104 may establish multiple communication links, such as a first link 108 between antenna 107 and antenna 105(a) of AP MLD 102 and a second link 109 between antenna 107 and antenna 105(b) of AP MLD 102. In other examples, more than two links may be established. Each of the links may include a communication channel, for example, on one of three RF bands: 2.4 Giga-Hertz (GHz), 5 GHz, or 6 GHz. As one illustrative example, a 6 GHz link may include a communication channel on the 6 GHz band. In some examples, a channel width of a communication channel may include multiple 20 MHz subchannels. Additionally or alternatively, the communication channel may be a multiple-input multiple-output (MIMO) channel with multiple antennas on each side.

In some examples, MLD client 104 may include multiple radios. For example, MLD client 104 may be a multi-radio MLD client having Simultaneous Transmit Receive (STR) capability (e.g., a multi-radio STR) or a multi-radio MLD client not having STR capability (e.g., a multi-radio non-STR). In other examples and as illustrated in FIG. 1, MLD client 104 may include a single radio (e.g., radio 106). For example, MLD client 104 may be an enhanced single radio MLD client or a single radio MLD client.

MLD capability enables MLD client 104 to transmit on at least two different links established during multi-link set up. However, based on a type of MLD client 104, a number of links on which MLD client 104 may be active at a same time varies. For example, if MLD client 104 is an enhanced single radio MLD client or single radio MLD client, MLD client 104 may only be active on one link at a time and thus, only capable of transmitting data on one link at a time. Alternatively, if MLD client 104 is a multi-radio STR MLD client or a multi-radio non-STR MLD client, MLD client 104 may be active on, and thus transmit on, two different links at the same time. When transmitting on two different links simultaneously, in some examples, MLD client 104 can transmit on two links within a same RF band (e.g., transmit on two different channels within one of 2.4 GHz, 5 GHz, or 6 GHz bands). In other examples, MLD client 104 can transmit on two links within different RF bands (e.g., transmit on a channel of 5 GHz band and on a channel of 6 GHz band).

AP MLD 102 may be a networking hardware device that enables other devices, such as MLD client 104, to connect to network 100. As an example, AP MLD 102 can be configured with a multi-radio software controller for use with Long Term Evolution (LTE), Wireless Fidelity (Wi-Fi), Worldwide Interoperability for Microwave Access (WiMAX), Global System for Mobile Communications (GSM), Code Division Multiple Access (CDMA), Wideband Code Division Multiple Access (WCDMA), etc. that includes N (e.g., 2, 4, 8, 16, etc.) independent 2×2 transceivers, N independent two channel receivers or sniffers, a radio frequency band from about 70 Megahertz (MHz) to about 6 Gigahertz (GHz), and a tunable channel bandwidth.

In other embodiments of the disclosure, rather than AP MLDs, devices may be used that may be connected to a cellular network that may communicate directly and wirelessly with user devices (e.g., MLD client 104) to provide access to wireless network 100 (e.g., Internet access). For example, these devices may comprise, but are not limited to, eNodeBs (eNBs) or gNodeBs (gNBs). A cellular network may comprise, but is not limited to, an LTE broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

For illustrative purposes, wireless network 100 includes one AP MLD 102 and one MLD client 104 associated with AP MLD 102; however, one or more additional MLD clients may be associated with AP MLD 102 in the BSS and a plurality of other AP MLDs and their associated MLD clients may be used in conjunction with wireless network 100 (e.g., forming other BSS in network 100). Additionally, while MLD client 104 is illustrated as a single radio MLD client, other MLD clients including multi-radio MLD clients may be used in conjunction with wireless network 100.

Components of wireless network 100 (e.g., AP MLD 102 and MLD client 104) may be practiced in hardware and/or in software (including firmware, resident software, microcode, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements, radio elements, or microprocessors. Furthermore, the components of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 5, aspects of wireless network 100 may be practiced in a computing device 500.

Figure 2:
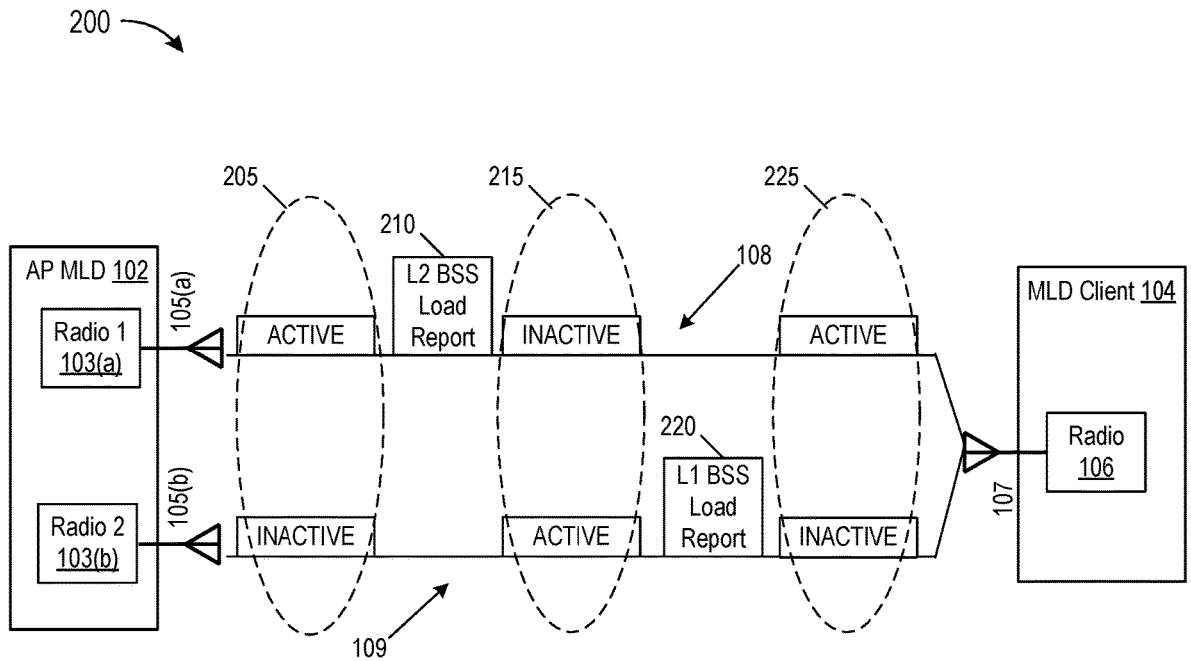
FIG. 2 is a diagram illustrating active link alternation by a multi-link device (MLD) client of the wireless network of FIG. 1.

FIG. 2 is a diagram 200 illustrating active link alternation by MLD client 104 of wireless network 100 of FIG. 1. As previously discussed, at least first link 108 and second link 109 may be established between AP MLD 102 and MLD client 104. As shown from left to right, at a first configuration 205, first link 108 may initially be the active link over which AP MLD 102 and MLD client 104 are communicating for data transmission (e.g., transmitting and receiving data), while second link 109 is initially the inactive link. Additionally, in this example, first link 108 may have a heavier traffic load than second link 109 based on data transmissions between AP MLD 102 and MLD client 104 (and potentially one or more other clients associated with AP MLD 102 that are also active on first link 108).

As part of an example mechanism for assisting MLD clients in selecting a link from the multiple established links upon which to operate, AP MLD 102 transmits a first out-of-link BSS load report 210 to MLD client 104 on first link 108, where first out-of-link BSS load report 210 includes a traffic load of at least second link 109. In some examples, first out-of-link BSS load report 210 may include a traffic load on all other links via which AP MLD 102 is communicating with clients on in the BSS except the current link on which the report is being transmitted (e.g., except for first link 108). MLD client 104 may also have knowledge of a traffic load on first link 108 based on an on-link BSS report (not illustrated here) transmitted from AP MLD 102 to MLD client 104 on first link 108. The traffic load data included in these various types of BSS reports may indicate how busy channels of the respective links are, the data including channel utilization and QBSS load metrics.

Responsive to receiving first out-of-link BSS load report 210 that includes the traffic load on at least second link 109 (and based on further knowledge of traffic load on first link 108), MLD client 104 determines that second link 109 has lesser traffic load than first link 108 (e.g., second link 109 is a least-loaded link). Based on this determination, MLD client 104 may alternate active links from first link 108 to second link 109 to follow the least-loaded link. In other examples, even if second link 109 is the least-loaded link, MLD client 104 may alternate active links only if first link 108 is also above a threshold channel utilization (e.g., may alternate to second link 109 if first link 108 is busy 85% or more of the time).

As a result of the alternation, at a second configuration 215, second link 109 is now the active link over which AP MLD 102 and MLD client 104 are communicating for data transmission (e.g., transmitting and receiving data), while first link 108 is the inactive link. In some examples, dependent on the traffic load of MLD client 104, second link 109 may now have a greater traffic load than first link 108 due to the traffic load of MLD client 104 now on second link 109. Additionally or alternatively, the one or more other clients associated with AP MLD 102 that are also active on first link 108 may receive the first out-of-link BSS load report 210 from AP MLD 102 on first link 108 (e.g., because AP MLD 102 transmits the first out-of-link BSS load report 210 in broadcast frames). Upon receipt, a portion of the one or more other clients that are MLD clients may, similarly to MLD client 104, alternate active links from first link 108 to second link 109 (or another least-loaded link). As a result, second link 109 may now have a greater traffic load than first link 108 due to the active link alternations causing traffic load of the multiple other MLD clients in addition to the MLD client 104 to now be on second link 109.

AP MLD 102 then transmits a second out-of-link BSS load report 220 on second link 109 to MLD client 104 and, if transmitted in a broadcast frame, to other clients associated with AP MLD 102 having the second link 109 as their active link as well. In some examples, second out-of-link BSS load report 220 may be a next immediate load report that follows the transmission of first out-of-link BSS load report 210. In other examples, second out-of-link BSS load report 220 may be transmitted following one or more additional cycles of active link alternation. As an illustrative example, rather than transmitting second out-of-link BSS load report 220 once the second configuration 215 has resulted from a first active link alternation, second out-of-link BSS load report 220 may instead be transmitted after a third configuration 225 (discussed below) has resulted from a second active link alternation. The second out-of-link BSS load report 220 reports the traffic load on at least first link 108. MLD client 104 may also have knowledge of traffic load on second link 109 based on an on-link BSS report (not illustrated here) transmitted from AP MLD 102 to MLD client 104 on second link 109.

Responsive to receiving second out-of-link BSS load report 220 (and based on knowledge of traffic load on second link 109), MLD client 104 determines that first link 108 has lesser traffic load than second link 109 (e.g., first link 108 is a least-loaded link). Based on this determination, MLD client 104 may again alternate active links from second link 109 to first link 108 to follow the least-loaded link. In other examples, even if first link 108 is the least-loaded link, MLD client 104 may alternate active links only if second link 109 is also above a threshold channel utilization.

As a result of the alternation, at a third configuration 225, first link 108 is once again the active link over which AP MLD 102 and MLD client 104 are communicating for data transmission (e.g., transmitting and receiving data), while second link 109 is the inactive link. Based on the traffic load of MLD client 104 and/or based on traffic load of a portion of one or more other MLD clients active on second link 109 that similarly alternate active links from second link 109 to first link 108 in response to the broadcasted second out-of-link BSS load report 220, first link 108 may again have the greater traffic load than second link 109. Thus, a pattern is established by which MLD client 104 (and/or other MLD clients) repetitively alternate between first and second links 108, 109 responsive to out-of-link BSS load reports transmitted from AP MLD 102, e.g., causing traffic load to be repetitively transferred to a least-loaded link. This pattern may also be referred to as zig-zag behavior.

In another embodiment, independent of receipt of an out-of-link BSS report, such as out-of-link BSS reports 210, 220 described above, MLD client 104 may temporarily alternate from a currently active link (of which the MLD client has a current traffic load knowledge thereof) to another link in order to retrieve information about traffic load on the other link to make a decision as to which link to transmit and receive data over. As one example, if MLD client 104 is a single radio client then the MLD client 104 may alternatively switch from the currently active link (e.g., first link 108) to the other link (e.g., second link 109). As another example, if MLD client 104 is a multi-radio client having a first radio on first link 108, MLD client 104 may temporarily switch on its second radio on second link 109. In either example, once temporarily on second link 109, MLD client 104 may passively receive a beacon on second link 109 that includes the traffic load information on second link 109 or may actively solicit an on-link BSS load report to be provided on second link 109. Having knowledge of traffic load on first link 108 and now second link 109, MLD client 104 may then determine whether to commit to alternating to second link 109 or maintain transmission and reception of data on first link 108.

Figure 3:
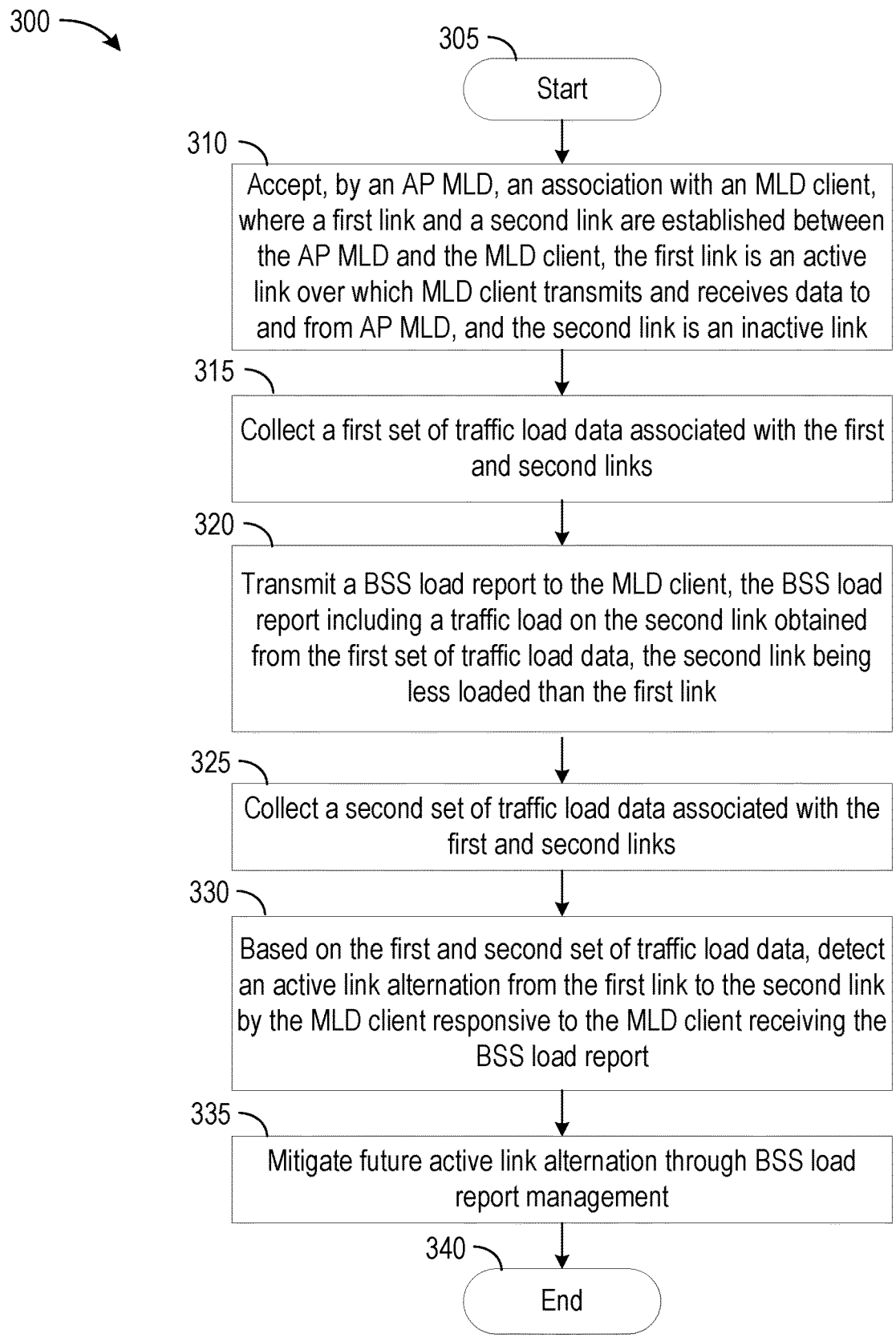
FIG. 3 is a flow chart illustrating an example method for detecting and mitigating active link alternation by an MLD client.

FIG. 3 is a flow chart illustrating an example method 300 for detecting and mitigating active link alternation by MLD client 104 as shown in FIG. 2. Method 300 may be implemented using computing device 500 (e.g., AP MLD 102) as described in more detail below with respect to FIG. 5. Ways to implement the stages of method 300 will be described in detail below.

Method 300 starts at stage 305 and continues to stage 310 where AP MLD 102 accepts an association with MLD client 104, and first link 108 and second link 109 may be established between AP MLD 102 and MLD client 104. First link 108 may be an active link over which MLD client 104 transmits and receives data to and from AP MLD 102 and second link 109 may be an inactive link (e.g., as shown in first configuration 205 in FIG. 2).

Method 300 proceeds to stage 315, where a first set of traffic load data associated with the first and second links 108, 109 is collected. The traffic load data may include information indicating how busy channels of the respective links are, the data including channel utilization and QBSS load metrics.

Method 300 then continues to stage 320, where a BSS load report is transmitted to MLD client 104. In one embodiment, the BSS load report may be an out-of-link BSS load report (e.g., first out-of-link BSS load report 210) transmitted on first link 108 to MLD client 104. The out-of-link BSS load report may include a traffic load on second link 109 that is obtained from the first set of traffic load data collected at stage 315. In this example, second link 109 may be less loaded than first link 108. In some examples, the out-of-link BSS load report may be transmitted in broadcast frames (e.g., may be multicast) such that one or more other associated MLD clients active on first link 108 may receive the out-of-link BSS load report. Additionally, MLD client 104 may receive a traffic load on first link 108 (e.g., the link on which MLD client 104 is currently active) through an on-link BSS report transmitted to MLD client. Thus, based on the on-link and out-of-link BSS reports, MLD client 104 may be aware that second link 109 is less loaded than first link 108. In another embodiment, independent of receipt of an out-of-link BSS report, MLD client 104 may be aware that second link 109 is less loaded than first link 108 based on MLD client 104 temporarily alternating to second link 109 to receive traffic load information on second link 109 (e.g., through passive receipt of a beacon or active solicitation of an on-link BSS load report). In other words, in this other embodiment, the BSS load report transmitted to MLD client 104 at stage 320 may be an on-link BSS load report transmitted on second link 109 to MLD client 104.

Method 300 proceeds to stage 325, where a second set of traffic load data associated with first and second links 108, 109 may be collected. Method 300 then proceeds to stage 330 where, based on the first and second sets of traffic load data collected at stage 315 and 325 respectively (e.g., before and after transmission of the out-of-link BSS load report), an active link alternation is detected from first link 108 to second link 109 by MLD client 104 responsive to MLD client 104 receiving the BSS load report (e.g., first out-of-link BSS load report 210). In other words, MLD client 104 is exhibiting zig-zagging behavior as illustrated and described in detail with reference to FIG. 2. In the other embodiment discussed above, an active link alternation may be responsive to the temporary alternation to and receipt of traffic load information (e.g., via the on-link BSS load report) on second link 109 by MLD client 104.

In some examples, the detection of active link alternation may be based upon a predefined number of MLD clients (e.g., a number of MLD clients over a threshold number) being identified as alternating between two links. Additionally, or alternatively, the detection may be based on differences in traffic load over two links as one or more MLD clients are alternating active links between the two links, where the differences may be obtained from the collected sets of traffic load data. For example, if two links show a repeating pattern of load imbalance (e.g., with the difference or load imbalance being evaluated against a predetermined threshold value or percentage), active link alternation may be occurring to an extent where mitigation thereof is desirable. For example, if a load imbalance exists where there is initially a 15% load on first link 108 and 85% load on second link 109 at first configuration 205, for example, and this load imbalance is maintained but with the 85% load on first link 108 and 15% load on second link 109 following transmission of an out-of-link BSS load report at second configuration 215, for example, active link alternation is likely occurring and to an extent where mitigation is desired to achieve balance among the links. Whereas, if a load imbalance exists where there is initially a 31% load on first link 108 and a 35% load on second link 109 at first configuration 205, for example, and this load imbalance is maintained but with the 35% load on first link 108 and 31% load on second link 109 following transmission of an out-of-link BSS load report at second configuration 215, for example, active link alternation is likely not occurring, or is not occurring to an extent that mitigation is necessary given the more balanced loads between the two links.

In another embodiment, a plurality of additional sets of traffic load data associated with first and second links 108, 109 may be collected and analyzed using machine learning techniques to identify particular types of MLD clients that may be more prone to alternate active links generally and/or under particular conditions. For example, based on a vendor associated with an MLD client, a model of the MLD client, and/or a software version run by the MLD client, behavior patterns of MLD clients may be detected from the analysis that may be used to build a predictive model or engine. This predictive model or engine may be implemented to predict and mitigate an active link alternation by an MLD client before it occurs. For example, identifying characteristics of an MLD client (e.g., vendor, model, software version) may be provided as input to the predictive model or engine in order to yield a probability of active link alternation occurring and/or particular conditions under which the active link alternation may occur as output. The output may then be compared to a mitigation threshold, for example, to determine whether or not one or more mitigation methods, described below, should be proactively applied.

Upon detection of active link alternation, method 300 continues to stage 335 where AP MLD 102 acts to reduce (or eliminate), e.g., mitigate, future active link alternation through BSS load report management. In some examples, the mitigation may also serve to reduce or eliminate effects of the active link alternation detected at stage 330. One or more mitigation methods may be applied, alone or in combination, and simultaneously or sequentially. Exemplary mitigation methods are described briefly in turn below, and in more detail with respect to FIG. 4.

A first mitigation method may include halting the broadcast of out-of-link BSS load reports. This first method prevents MLD client 104 from receiving information about load conditions on other links, such as an established link that is currently an inactive link. The absence of knowledge of load conditions on other links by MLD client 104 may prevent, or at least make it less likely that, MLD client 104 will continue to alternate active links to follow the least-loaded link because the MLD client will be unaware that the current link it is active on is or is not the least-loaded link. In other examples, rather than halt the broadcast, incorrect information about traffic load on the other links may be transmitted via the out-of-link BSS load reports to dissuade MLD client 104 from continuing to alternate active links.

A second mitigation method may include modifying traffic load values that are transmitted to MLD client 104 in a unicast BSS load report (e.g., a load modification scheme). In some examples, and as described in more detail with respect to FIG. 4, this modification may be performed if active link alternation by only one MLD client (e.g., MLD client 104) is detected. The modification may include adding a determined traffic load of MLD client 104 to the traffic load on other link(s) (e.g., inactive links such as first link 108) that are obtained from the second set of traffic load data. The modified traffic load may be provided in a unicast out-of-link BSS report on second link 109 to the MLD client to simulate what the traffic load on first link 108 would be if the MLD client opted to switch its active link back to first link 108. Resultantly, MLD client 104 will not, or is at least less likely to, switch its active link because first link 108 will erroneously appear more loaded than it is (e.g., more loaded than second link 109 upon which MLD client 104 is currently active).

Additionally, or alternatively, as part of the modification, a traffic load on the currently active link (e.g., second link 109) may be obtained from the second set of traffic data and modified to remove the determined traffic load of MLD client 104 to simulate what the traffic load of second link 109 would be if MLD client 104 switched active links. This modified traffic load data on second link 109 may be included within an on-link BSS report transmitted on second link 109 to MLD client 104. Resultantly, MLD client 104 will not, or is at least less likely to, switch its active link as its currently active, second link 109 will erroneously appear less loaded than it is (e.g., less loaded than the others link(s) such as inactive first link 108).

A third mitigation method may be a load balancing scheme, where selective unicast BSS load reporting is performed. In some examples, and as described in more detail with respect to FIG. 4, this third mitigation method may be applied when active link alternation by more than one MLD client is detected. For example, out-of-link BSS load reports may be transmitted unicast to selected MLD clients on the link with the greatest load (e.g., now second link 109) on a one-by-one basis. The unicast out-of-link BSS load report informs a selected MLD client of traffic load on a lesser loaded link (e.g., first link 108) to prompt the selected MLD client to switch its active link to the lesser loaded link (e.g., effectively reverse the active link alternation detected at operation 330). This process may be repeated on a one-by-one basis for one or more additional selected MLD clients on the link with the greatest load until a desired or predetermined load balance among the links is established.

A fourth mitigation method may include a brute force method of disassociating MLD client 104 from AP MLD 102. MLD client 104 may then be invited to reassociate with AP MLD 102.

Following the application of one or more of these methods to mitigate future active link alternation, method 300 ends at stage 340.

Figure 4:
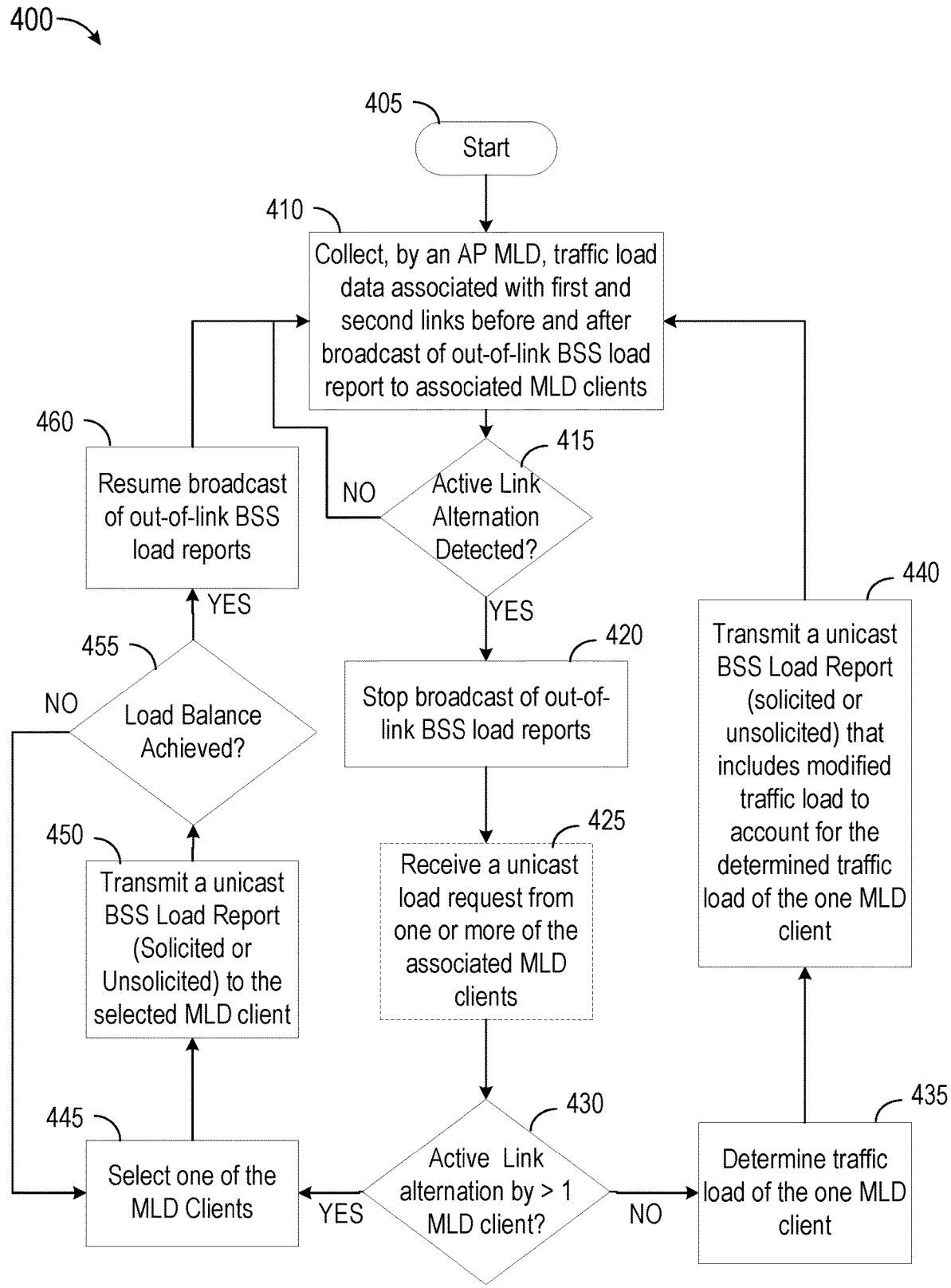
FIG. 4 is a flow diagram illustrating exemplary BSS load report management methods applied for mitigating active link alternation.

FIG. 4 is a flow diagram 400 illustrating exemplary BSS load report management methods applied for mitigating active link alternation. Method 400 may be implemented using computing device 500 (e.g., AP MLD 102) as described in more detail below with respect to FIG. 5. Ways to implement the stages of method 400 will be described in detail below.

Exemplary method 400 includes a combination of the first, second, and third mitigation methods described with respect to FIG. 1. However, this particular combination and/or sequence in which the first, second, and third mitigation methods are implemented is exemplary and not intended to be limiting. Other combinations of one or more mitigation methods in different sequences may be implemented.

As shown, method 400 starts at stage 405 and continues to stage 410 where AP MLD 102 may collect traffic load data associated with at least first and second links 108, 109 before and after transmitting an out-of-link BSS load report (e.g. multicast) to one or more associated MLD clients, including MLD client 104. Each associated MLD client may have at least two links established with AP MLD 102. At least a portion of those MLD clients may be single radio MLD clients that are capable of being active on only one of the two links at a time.

At stage 415, based on the collected traffic load data, a determination of whether active link alternation by at least one of the associated MLD clients is detected. Details regarding detection of active link alternation are described above with respect to stage 330 of method 300. If no active link alternation is detected, method 400 returns to stage 410 and AP MLD 102 continues to collect traffic load data subsequent to transmitting out-of-link BSS load reports. If active link alternation is detected, method 400 continues to stage 420 where the transmission of out-of-link BSS load reports in a broadcasted manner may be halted (e.g., temporarily suspended), e.g., the first mitigation method described herein may be applied.

Method 400 includes optional stage 425, where AP MLD 102 may receive a unicast load request from one or more of the MLD clients to provide the MLD clients with traffic load information on other links (e.g., links on which the MLD clients are not currently active on). A solicited response to the unicast load, if one is provided at all, may be dependent on which mitigation method is applied, as detailed below. Method 400 may continue to stage 430, where it is determined whether active link alternation by more than one MLD client has been detected.

If not (e.g., if only one MLD client is detected), method 400 proceeds to stage 435 to determine the one MLD client's traffic load. The determined traffic load of the one MLD client from stage 435 is then used at stage 440 to modify a traffic load that is included within a unicast BSS load report transmitted to the one MLD client e.g., the second mitigation described herein may be applied.

In some examples, the unicast BSS load report may be an out-of-link report transmitted to the one MLD client on its currently active link. The determined traffic load of the one MLD client from stage 435 may be added to a traffic load on an inactive link of the one MLD client for inclusion in the out-of-link report to simulate the load that would be experienced by the inactive link should the one MLD client alternate active links again (e.g., switch from its currently active link to the inactive link). This modification may cause the inactive link to appear to have a greater load than it actually does (e.g., greater than a load of the currently active link), making it less likely for the one MLD client to alternate active links again.

In other examples, the unicast BSS load report may be an on-link report transmitted to the one MLD client on its currently active link. The determined traffic load of the one MLD client from stage 435 may be removed (e.g., subtracted) from the traffic load on the currently active link for inclusion in the on-link report to simulate the load that would be experienced by the currently active link should the one MLD client alternate active links again (e.g., switch from the currently active link to an inactive link). This modification may cause the currently active link appear to have a lesser load than it actually does (e.g., lesser than a load of an inactive link), making it less likely for the one MLD client to alternate active links again.

In further examples, both on-link and out-of-link BSS reports having the traffic load modified as described in the above two examples may be transmitted unicast to the one MLD client on the currently active link.

One or more of the unicast BSS load reports may be sent responsive to the unicast load request made by the one MLD client, if such a request was made at optional stage 425. Otherwise, the reports may be sent unsolicited to the one MLD client. Method 400 then returns to stage 410 where AP MLD 102 continues to collect traffic load data subsequent to transmitting out-of-link BSS load reports.

If active link alternation by more than one MLD client is detected at stage 430, the third mitigation method (e.g., the load balancing scheme) described herein may be applied. For example, if alternation is detected by a group of MLD clients comprising two or more clients that as a result of the alternation are now active on a more highly loaded link, method 400 proceeds to stage 445, where one of the MLD clients is selected from the group that is active on the highly loaded link.

In some examples, the MLD client may be selected based on priority, where priority may be determined based on one or more factors. One example factor includes a traffic load of the MLD client, where an MLD client with a greater traffic load may be selected to make a more significant impact on load balance efforts (e.g., as discussed with respect to stages 450 and 455). Another example factor includes a type of the MLD client's traffic, such as a traffic access category (e.g., voice, video, best effort, and background) and a susceptibility of the traffic to disruption. As one example, if an MLD client is running high priority voice applications that are susceptible to disruption, this MLD client may be less likely to be selected to avoid such disruption. As another example, it may be optimal to invite traffic of a first access category (e.g., voice) to be communicated over one link, while traffic of a second access category (e.g., background) to be communicated over another link. Thus, if an MLD client has voice traffic that is optimal to be communicated over a link on which the MLD client is current inactive, the MLD client may be prioritized for selection. As a further example, prioritization may be based on MLD clients' channel qualities on each link. In other examples, the first MLD client may be selected from the group randomly.

Once one of the MLD clients is selected from the group, method 400 continues to stage 450, where a unicast BSS load report is transmitted to the selected MLD client on the active, more highly loaded link. The unicast BSS load report may include traffic load of other less loaded links, such as the current inactive link of the selected MLD client, to prompt the selected MLD client to alternate active links to the lesser loaded link. The unicast BSS load report may be sent responsive to the unicast load request made by the selected MLD client, if such a request was made at optional stage 425. Otherwise, the unicast BSS load report may be sent unsolicited to the selected MLD client.

Method 400 continues to stage 455, where a determination is made as to whether a predetermined load balance among the links has been achieved after the selected MLD has responded to the unicast BSS load report (e.g., by alternating active links to the lesser loaded link).

If the predetermined load balance has not been achieved, method 400 returns to stage 445 where a next MLD client in the group may be selected (e.g., based on priority or randomly as described above). A unicast BSS load report may be transmitted to the next MLD client at stage 450, and a determination may be made as to whether the predetermined load balance among the links has been achieved after the next MLD has responded to the unicast BSS load report at stage 455. Stages 445, 450 and 455 of method 400 may be iteratively repeated until the predetermined load balance is achieved.

If (or once) the predetermined load balance is determined to have been achieved at stage 455, method 400 proceeds to stage 460, where transmission of out-of-link BSS load reports may be resumed in a broadcasted manner. Method 400 may then return to stage 410, where AP MLD 102 continues to collect traffic load data subsequent to transmitting out-of-link BSS load reports.

In view of the present disclosure, it can be appreciated that methods 300 and 400 provide technical solutions for detecting active link alternation by one or more MLD clients and mitigating future active link alternations (and in some examples, also mitigating effects of the currently detected active link alternation). These solutions enable balanced traffic loads among links in a BSS, which serves to reduce latency of data transmissions as well as achieve gains in throughput (e.g., if channel utilization meet a predefined threshold as a result of the load balancing).

Figure 5:
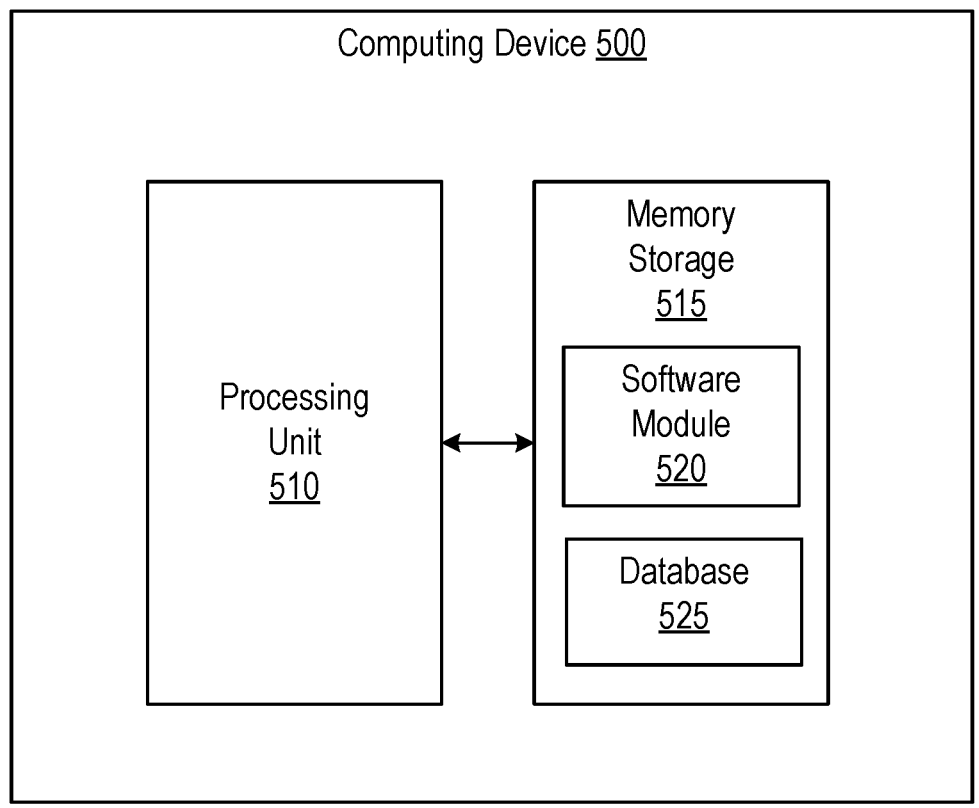
FIG. 5 is a block diagram of a computing device.

FIG. 5 shows computing device 500. As shown in FIG. 5, computing device 500 may include a processing unit 510 and a memory unit 515. Memory unit 515 may include a software module 520, and software database 525, and additional logic. While executing on processing unit 510, software module 520 may perform, for example, processes for detecting and mitigating active link alternation as described herein. Computing device 500, for example, may provide an operating environment for AP MLD 102, MLD client 104, etc. Other operational environments may be utilized, and the present disclosure is not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where elements may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   accepting, by an Access Point (AP) Multi-Link Device (MLD), an association with an MLD client, wherein at least a first link and a second link are established between the AP MLD and the MLD client, the first link is an active link over which the MLD client transmits and receives data to and from the AP MLD;
   collecting a first set of traffic load data associated with the first and second links;
   transmitting a Basic Service Set (BSS) load report to the MLD client, the BSS load report including a traffic load on the second link obtained from the first set of traffic load data, the second link being less loaded than the first link;
   collecting a second set of traffic load data associated with the first and second links;
   based on the first and second set of traffic load data, detecting an active link alternation from the first link to the second link by the MLD client responsive to the MLD client receiving the BSS load report; and
   mitigating future active link alternation through BSS load report management.

2. The method of claim 1, further comprising:
   based on the first and second set of traffic load data, detecting a difference in traffic load on the first link and the second link that meets a predetermined threshold; and
   mitigating future active link alternation through BSS load report management when the detected difference meets the predetermined threshold.

3. The method of claim 1, wherein transmitting the BSS load report to the MLD client comprises:
   transmitting an out-of-link BSS load report on the first link to the MLD client that includes the traffic load on the second link obtained from the first set of traffic load data.

4. The method of claim 3, wherein the out-of-link BSS load report is transmitted in a broadcast frame, and mitigating future active link alternation through BSS load report management comprises:
   halting transmission of additional out-of-link BSS load reports in broadcast frames.

5. The method of claim 1, wherein the MLD client temporarily alternates the active link from the first link to the second link, and transmitting the BSS load report to the MLD client comprises:
   transmitting an on-link BSS load report on the second link to the MLD client that includes the traffic load on the second link obtained from the first set of traffic load data.

6. The method of claim 1, wherein mitigating future active link alternation through BSS load report management comprises:
   determining a traffic load of the MLD client;
   obtaining a traffic load on the first link from the second set of traffic load data;
   modifying the traffic load on the first link to include the determined traffic load of the MLD client; and
   transmitting a unicast out-of-link BSS load report to the MLD client on the second link, the unicast out-of-link BSS load report including the modified traffic load on the first link.

7. The method of claim 1, wherein mitigating future active link alternation by the MLD client through BSS load report management comprises:
   determining a traffic load of the MLD client;
   obtaining a traffic load on the second link from the second set of traffic load data;
   modifying the traffic load on the second link to remove the determined traffic load of the MLD client; and
   transmitting a unicast on-link BSS load report to the MLD client on the second link, the unicast on-link BSS load report including the modified traffic load on the second link.

8. The method of claim 1, further comprising:
   based on the first and second set of traffic load data, detecting active link alternations from the first link to the second link by a group of MLD clients, wherein the group of MLD clients include the MLD client and one or more other associated MLD clients having established at least the first link and the second link with the AP MLD, the active link alternations causing the first link to be a less loaded link than the second link.

9. The method of claim 8, wherein mitigating future active link alternation through BSS load report management comprises:
   selecting, from the group of MLD clients, a first MLD client; and
   sending a unicast out-of-link BSS load report to the first MLD client on the second link, the unicast out-of-link BSS load report including a traffic load on the first link obtained from the second set of traffic load data to prompt the first MLD client to reverse the active link alternation.

10. The method of claim 9, wherein the first MLD client is selected based on a priority of the first MLD client, and the priority is based on at least one of a link channel quality of the first MLD client, a traffic load of the first MLD client, and a type of traffic associated with the first MLD client.

11. The method of claim 9, further comprising:
    after sending the unicast out-of-link BSS load report to the first MLD client, determining whether a predefined traffic load balance has been reached between the first link and the second link; and
    until the predefined traffic load balance is reached, iteratively:
      selecting, from the group of MLD clients, a next MLD client; and
      sending a unicast out-of-link BSS load report to the next MLD client on the second link, the unicast out-of-link BSS load report including a traffic load on the first link to prompt the next MLD client to reverse the active link alternation.

12. The method of claim 1, wherein mitigating future active link alternation through BSS load report management comprises:
    disassociating the MLD client from the AP MLD; and
    inviting the MLD client to re-associate with the AP MLD.

13. The method of claim 1, further comprising:
in addition to the first and second set of traffic load data, continuously collecting a plurality of additional sets of traffic load data;
based on the plurality of additional sets of traffic load data, identifying types of MLD clients prone to active link alternation; and
for the identified types of MLD clients, proactively mitigating active link alternation prior to detecting active link alternation.

14. An apparatus comprising:
a memory storage; and
a processing unit coupled to the memory storage, wherein the processing unit is operative to:
accept, by an Access Point (AP) Multi-Link Device (MLD), an association with one or more MLD clients, wherein a first link and a second link are established between the AP MLD and each of the one or more MLD clients, the first link is an active link over which each of one or more MLD clients transmits and receives data to and from the AP MLD;
collect a first set of traffic load data associated with the first and second links;
transmit a Basic Service Set (BSS) load report to the one or more MLD clients, the BSS load report including a traffic load on the second link obtained from the first set of traffic load data, the second link being less loaded than the first link;
collect a second set of traffic load data associated with the first and second links;
based on the first and second set of traffic load data, detect an active link alternation from the first link to the second link by at least one MLD client of the one or more MLD clients responsive to the one or more MLD clients receiving the BSS load report; and
apply at least one of a plurality of methods for BSS load report management to mitigate future active link alternation.

15. The apparatus of claim 14, wherein the BSS load report is an out-of-link BSS load report transmitted to the one or more of the MLD clients in a broadcast frame on the first link, and to apply a first method of the plurality of methods, the processing unit is further operative to:
halt transmission of additional out-of-link BSS load reports in broadcast frames.

16. The apparatus of claim 14, wherein to apply a second method of the plurality of methods, the processing unit is further operative to:
determine a traffic load of the at least one MLD client;
obtain a traffic load on the first link from the second set of traffic load data;
modify the traffic load on the first link to include the determined traffic load of the at least one MLD client; and
send a unicast out-of-link BSS load report to the at least one MLD client on the second link, the unicast out-of-link BSS load report including the modified traffic load on the first link.

17. The apparatus of claim 14, wherein, based on the first and second set of traffic load data, active link alternations from the first link to the second link by a group comprised of at least two or more MLD clients are detected, and to apply a third method of the plurality of methods, the processing unit is further operative to:
until a predefined traffic load balance is reached between the first link and the second link, iteratively:
select, from the group, an MLD client; and
send a unicast out-of-link BSS load report to the selected MLD client on the second link, the unicast out-of-link BSS load report including a traffic load on the first link obtained from the second set of traffic load data to prompt the selected MLD client to reverse the active link alternation.

18. The apparatus of claim 14, wherein to apply a fourth method of the plurality of methods, the processing unit is further operative to:
disassociate the at least one MLD client from the AP MLD; and
invite the at least one MLD client to re-associate with the AP MLD.

19. A non-transitory computer-readable medium that stores a set of instructions, which when executed by a processing unit, perform a method comprising:
accepting, by an Access Point (AP) Multi-Link Device (MLD), an association with an MLD client, wherein a first link and a second link are established between the AP MLD and the MLD client, the first link is an active link over which the MLD client transmits and receives data to and from the AP MLD;
collecting a first set of traffic load data associated with the first and second links;
transmitting a Basic Service Set (BSS) load report on the first link to the MLD client, the BSS load report including a traffic load on the second link obtained from the first set of traffic load data, the second link being less loaded than the first link;
collecting a second set of traffic load data associated with the first and second links;
based on the first and second set of traffic load data, detecting an active link alternation from the first link to the second link by the MLD client responsive to the MLD client receiving the BSS load report; and
applying at least one of a plurality of methods for BSS load report management to mitigate future active link alternation.

20. The non-transitory computer-readable medium of claim 19, wherein the plurality of methods include at least:
a first method to halt transmission of out-of-link BSS load reports in broadcast frames on the first link;
a second method to modify a traffic load on the first link obtained from the second set of traffic load data with a determined traffic load of the MLD client within a unicast out-of-link BSS load report transmitted to the MLD client on the second link;
a third method to achieve load balance between the first and second links when active link alternation by more than one MLD client is detected; and
a fourth method to disassociate the MLD client from the AP MLD.

* * * * *